(12) United States Patent
Wolkerstorfer et al.

(10) Patent No.: US 10,275,523 B1
(45) Date of Patent: Apr. 30, 2019

(54) DOCUMENT DATA CLASSIFICATION USING A NOISE-TO-CONTENT RATIO

(71) Applicant: Amazon Technologies, Inc., Reno, NV (US)

(72) Inventors: Bernhard Wolkerstorfer, Seattle, WA (US); Lei Li, Kirkland, WA (US); Narendra S. Parihar, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 15/668,537

(22) Filed: Aug. 3, 2017

Related U.S. Application Data

(62) Division of application No. 13/614,858, filed on Sep. 13, 2012, now Pat. No. 9,773,182.

(51) Int. Cl.
| | | |
|---|---|---|
| *G06F 17/00* | (2006.01) | |
| *G06F 17/30* | (2006.01) | |
| *G06K 9/20* | (2006.01) | |
| *G06K 9/62* | (2006.01) | |

(52) U.S. Cl.
CPC ..... *G06F 17/30707* (2013.01); *G06K 9/2054* (2013.01); *G06K 9/6255* (2013.01); *G06K 9/6267* (2013.01); *G06K 2209/01* (2013.01)

(58) Field of Classification Search
CPC .. G06K 9/3208; G06K 9/6202; G06K 9/2054; G06K 9/6255; H04L 63/0227; G06F 17/30707
See application file for complete search history.

(56) References Cited

U.S. PATENT DOCUMENTS

| | | | |
|---|---|---|---|
| 2004/0093328 A1* | 5/2004 | Damle | G06F 17/2785 |
| 2005/0060643 A1* | 3/2005 | Glass | G06F 17/241 |
| | | | 715/205 |
| 2005/0246296 A1 | 11/2005 | Ma et al. | |
| 2007/0011151 A1* | 1/2007 | Hagar | G06F 17/30654 |
| 2008/0178288 A1* | 7/2008 | Alperovitch | H04L 63/0227 |
| | | | 726/22 |
| 2009/0086275 A1* | 4/2009 | Liang | H04N 1/3878 |
| | | | 358/3.21 |
| 2009/0248707 A1* | 10/2009 | Mehta | G06F 17/212 |
| 2010/0033745 A1* | 2/2010 | Dai | G06K 9/00456 |
| | | | 358/1.9 |
| 2010/0169311 A1* | 7/2010 | Tengli | G06F 17/30864 |
| | | | 707/736 |
| 2011/0131485 A1 | 6/2011 | Bao et al. | |
| 2011/0194770 A1* | 8/2011 | Kim | G06K 9/00456 |
| | | | 382/176 |
| 2012/0274991 A1* | 11/2012 | Roy | H04N 1/387 |
| | | | 358/462 |

(Continued)

*Primary Examiner* — Stephen S Hong
*Assistant Examiner* — Marshon L Robinson
(74) *Attorney, Agent, or Firm* — Lowenstein Sandler LLP

(57) ABSTRACT

A method and system for classifying document data is described. The method may include classifying a first portion of an electronic document as substantive content or noise, classifying a second portion of the electronic document as substantive content or noise, determining a first feature of the first portion of the electronic document indicative of substantive content using a machine learning algorithm, and determining a second feature of the second portion of the electronic document indicative of noise using the machine learning algorithm.

20 Claims, 8 Drawing Sheets

(56) References Cited

U.S. PATENT DOCUMENTS

2013/0138655 A1* 5/2013 Yan .................. G06F 17/30702
707/738
2014/0013221 A1 1/2014 Zheng et al.

* cited by examiner

DOCUMENT DATA CLASSIFICATION USING A NOISE-TO-CONTENT RATIO

RELATED APPLICATION

This application is a divisional of U.S. patent application Ser. No. 13/614,858, filed Sep. 13, 2012, the entire contents of which is hereby incorporated by reference.

BACKGROUND

A large and growing population of users employs various electronic devices to read digital content such as articles, journals, magazines, electronic books (e-books), news feeds and blog feeds. Among these electronic devices are e-book readers (also known as e-readers), cellular telephones, personal digital assistants (PDAs), portable media players, tablet computers, netbooks, and the like.

Digital content often includes web pages provided by various content hosting websites. Converting web pages into a format appropriate for e-readers or other electronic devices typically involves removing noise from the web pages. Noise may include, for example, advertisements, navigation panels, links, small images, comments, and the like. As e-readers and other electronic devices continue to proliferate, finding inexpensive and effective ways to remove noise from web pages continues to be a priority.

BRIEF DESCRIPTION OF THE DRAWINGS

Embodiments of the present disclosure will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Methods and systems for classifying portions of an electronic document based on a noise-to-content ratio are described. An electronic document may be a markup language (e.g., HTML, XHTML or XML) document or a web page provided by a content hosting web site or any other source and may include a newspaper article, a journal article, an electronic book (e-book), a news feed, a blog feed, or any other digital media item that can contain noise in addition to substantive content. Noise may include, for example, advertisements, navigation panels, links, small images, banners, comment sections, promotions or any other information that is unlikely to be interesting to a user reading an article or any similar document. Substantive content may include, for example, the title, byline (e.g., the name and the position of the author), text content and related images, and/or any other information that is likely to be interesting to a user reading an article or any similar document.

In one embodiment, a document data classification subsystem classifies portions of an electronic document using metrics indicative of substantive content and metrics indicative of noise. Metrics indicative of substantive content may include, for example, a number of words in a document portion, a number of plain text characters (text characters that are not part of links) in the document portion, a number of lines and/or paragraphs in the document portion, lengths of lines in the document portion, etc. Metrics indicative of noise may include, for example, invisibility of the document portion during rendering of the document, an advertisement or comment included in the document portion, a ratio of links to text in the document portion, a ratio of text in links to plain text in the document portion, a number of images and/or links referring to advertisement providers in the document portion, a number of small images in the document portion, etc.

The document data classification subsystem can determine the above metrics of a document portion, and can calculate a substantive content score of the document portion based on its metrics indicative of substantive content, and a noise score of the document portion based on its metrics indicative of noise. The document data subsystem can then use the substantive content score and the noise score to determine a noise-to-content ratio of the document portion. When a similar process is performed for other portions of the document, the portions of the document can be sorted based on their noise-to-content ratios. Next, one or more portions of the document with lower noise-to-content ratio can be classified as substantive content, and the other portions of the document can be classified as noise. Substantive content portions may then be converted into a format understandable by e-readers or other mobile devices.

Figure 1:
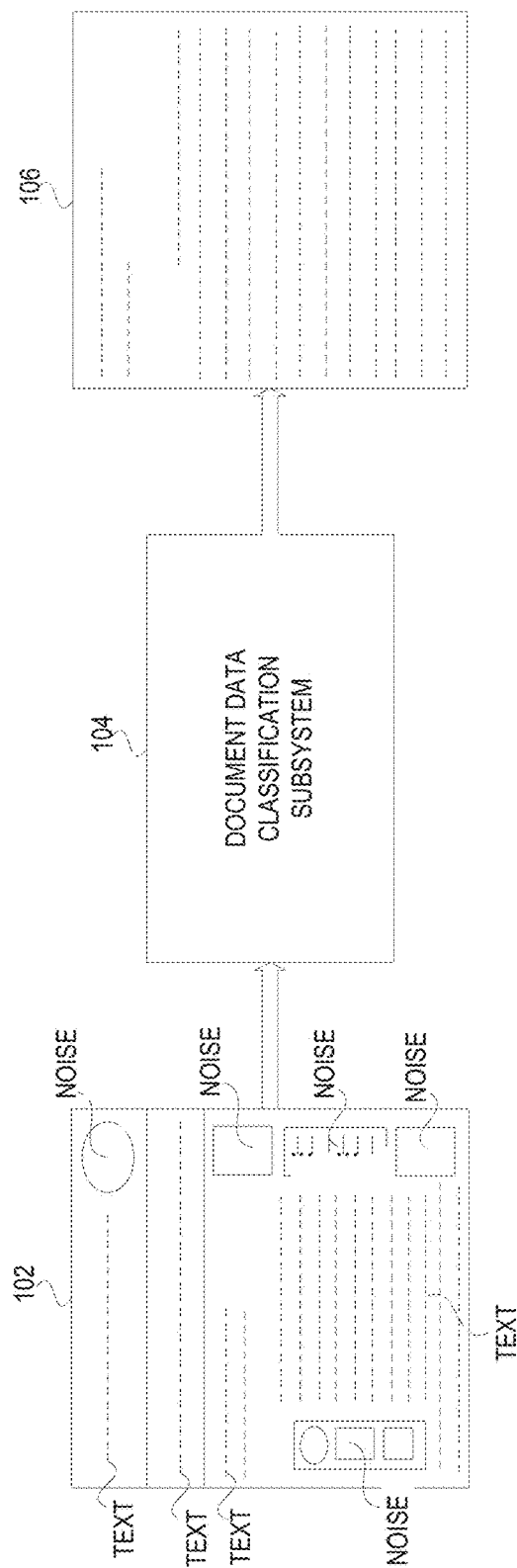
FIG. 1 illustrates the removal of noise from electronic documents in accordance with some embodiments of the present disclosure.

FIG. 1 illustrates the removal of noise from electronic documents in accordance with some embodiments of the present disclosure. As shown, web page 102 includes text portions and noise portions such as small images, advertisements, comments and unrelated content blocks. Web page 102 is processed by document data classification subsystem 104 that classifies portions of web page 104 as noise or substantive content using the process discussed above, and removes noise portions from web page 102, resulting in web page 106 that contains substantive content and no noise.

Accordingly, an efficient mechanism is provided that automatically extracts content that is likely to be interesting to users of e-readers and other mobile devices. As a result, the number of electronic documents available for mobile devices is increased, and manual operational costs are significantly reduced.

Figure 2:
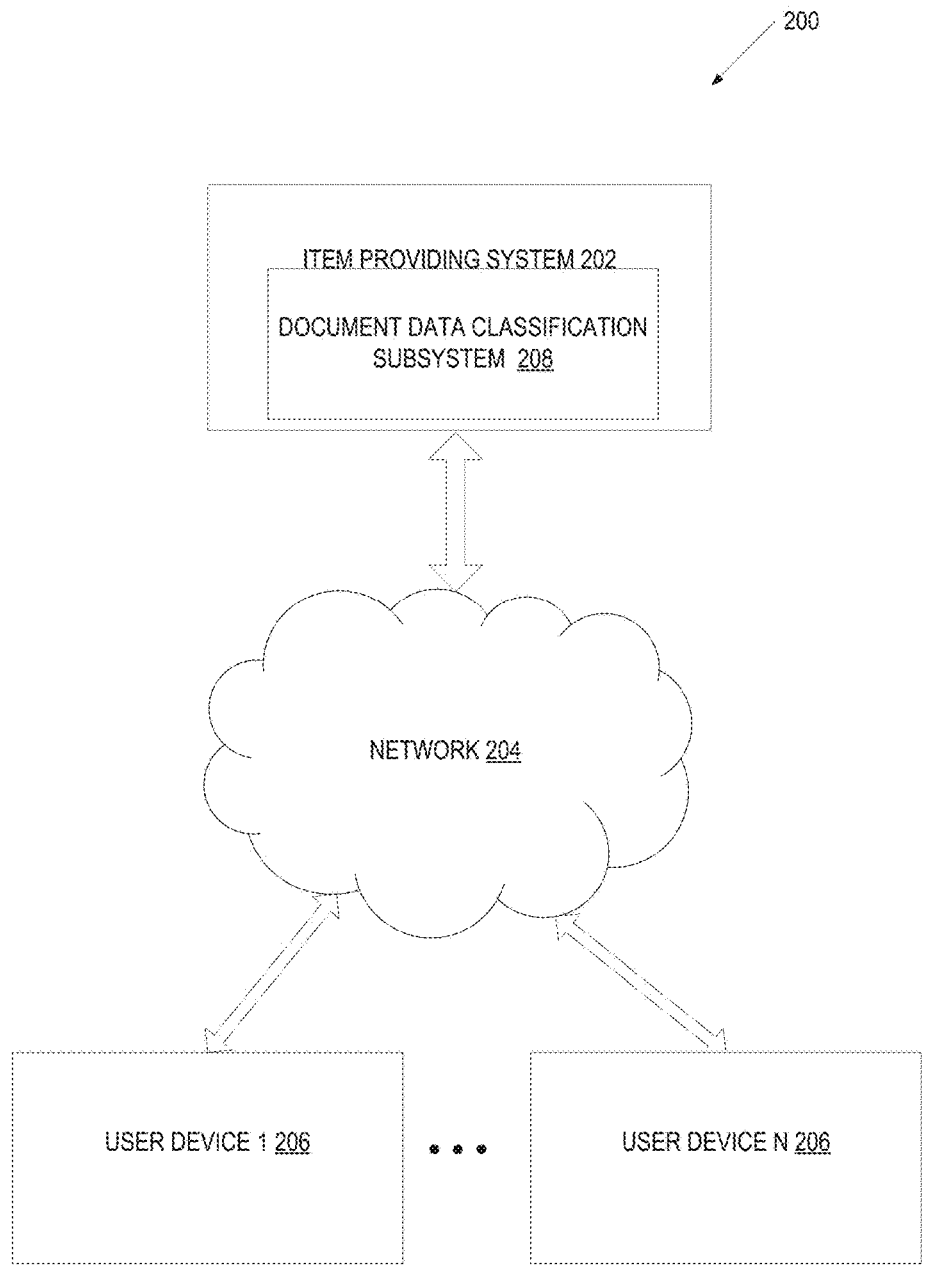
FIG. 2 is a block diagram of a network architecture in which embodiments of the present disclosure may operate.

FIG. 2 is a block diagram of network architecture 200 in which embodiments of the present disclosure may operate. The network architecture 200 may include an item providing system 202 and multiple user devices 206 coupled to the item providing system 202 via a network 204 (e.g., a public network such as the Internet, a private network such as a local area network (LAN), or a virtual private network (VPN)).

The user devices 206 are variously configured with different functionality to enable consumption of electronic documents such as newspaper articles, journal articles, magazine articles, news feeds, and blog feeds, and other semi-structured documents that contain noise in addition to the main content. The user devices 206 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The item providing system 202 provides electronic documents, upgrades, and/or other information to the user devices 206 registered with the item providing system 202 via the network 204. The item providing system 202 also receives various requests, instructions and other data from the user devices 206 via the network 204. The item providing system 202 may include one or more machines (e.g., one or more server computer systems, routers, gateways) that have processing and storage capabilities to provide the above functionality.

Communication between the item providing system 202 and a user device 206 may be enabled via any communication infrastructure. One example of such an infrastructure includes a combination of a wide area network (WAN) or a VPN and wireless infrastructure, which allows a user to use the user device 206 to purchase items and consume items without being tethered to the item providing system 202 via hardwired links. The wireless infrastructure may be provided by a wireless carrier system that can be implemented using various data processing equipment, communication towers, etc. Alternatively, or in addition, the wireless carrier system may rely on satellite technology to exchange information with the user device 206. Yet alternatively, or in combination, the wireless infrastructure may be provided by an access point (e.g., WiFi access point) provider system.

In one embodiment, the item providing system 202 includes a document data classification subsystem 208 that facilitates conversion of electronic documents from various sources (e.g., news services, content hosting websites, etc.) into a device-readable format by removing noise from electronic documents. The document data classification subsystem 208 derives a model for classifying document portions from a training set of electronic documents that have portions manually classified as noise or substantive content. In one embodiment, the classification model lists features indicative of substantive content and features indicative of noise, and specifies which of those features are more significant for noise classification and substantive content classification. Examples of features significant for substantive content classification may include, for example, a number of words in a document portion, a number of plain text characters (text characters that are not part of links) in the document portion, a number of lines and/or paragraphs in the document portion, lengths of lines in the document portion, etc. Features significant for noise classification may include, for example, visibility of the document portion during rendering of the document, an advertisement or comment included in the document portion, a ratio of links to text in the document portion, a ratio of text in links to plain text in the document portion, a number of images and/or links referring to advertisement providers in the document portion, a number of small images (images smaller than a size threshold) in the document portion, etc.

At runtime, the document data classification subsystem 208 determines metrics for the above features for individual portions of an electronic document. In particular, the document data classification subsystem 208 determines, for a document portion, metrics indicative of substantive content based on significant substantive content features and metrics indicative of noise based on significant noise features. The document data classification subsystem 208 then calculates, for the document portion, a substantive content score based on the metrics indicative of substantive content, a noise score based on metrics indicative of noise, and a noise-to-content ratio based on the substantive content score and the noise score.

The document data classification subsystem 208 repeats this process for other document portions, and classifies document portions with higher noise-to-content ratios as noise and document portions with lower noise-to-content ratios as substantive content. The document data classification subsystem 208 then coverts the document portions classified as substantive content into a format understandable by user devices 206. Alternatively, the document data classification subsystem 300 provides the document portions classified as substantive content to a formatting subsystem (not shown) for conversion. The formatting subsystem may be part of the item providing system 202 or may be part of another system coupled to the item providing system 202 directly or via a network.

It should be noted that although FIG. 2 shows that the document data classification subsystem 208 resides on the item providing system 202, the present disclosure should not be limited to this implementation. Rather, the document data classification subsystem 208 can reside on any other computer system, including a user device 206 or any other device or a combination of devices not shown in FIGS. 2.

Figure 3:
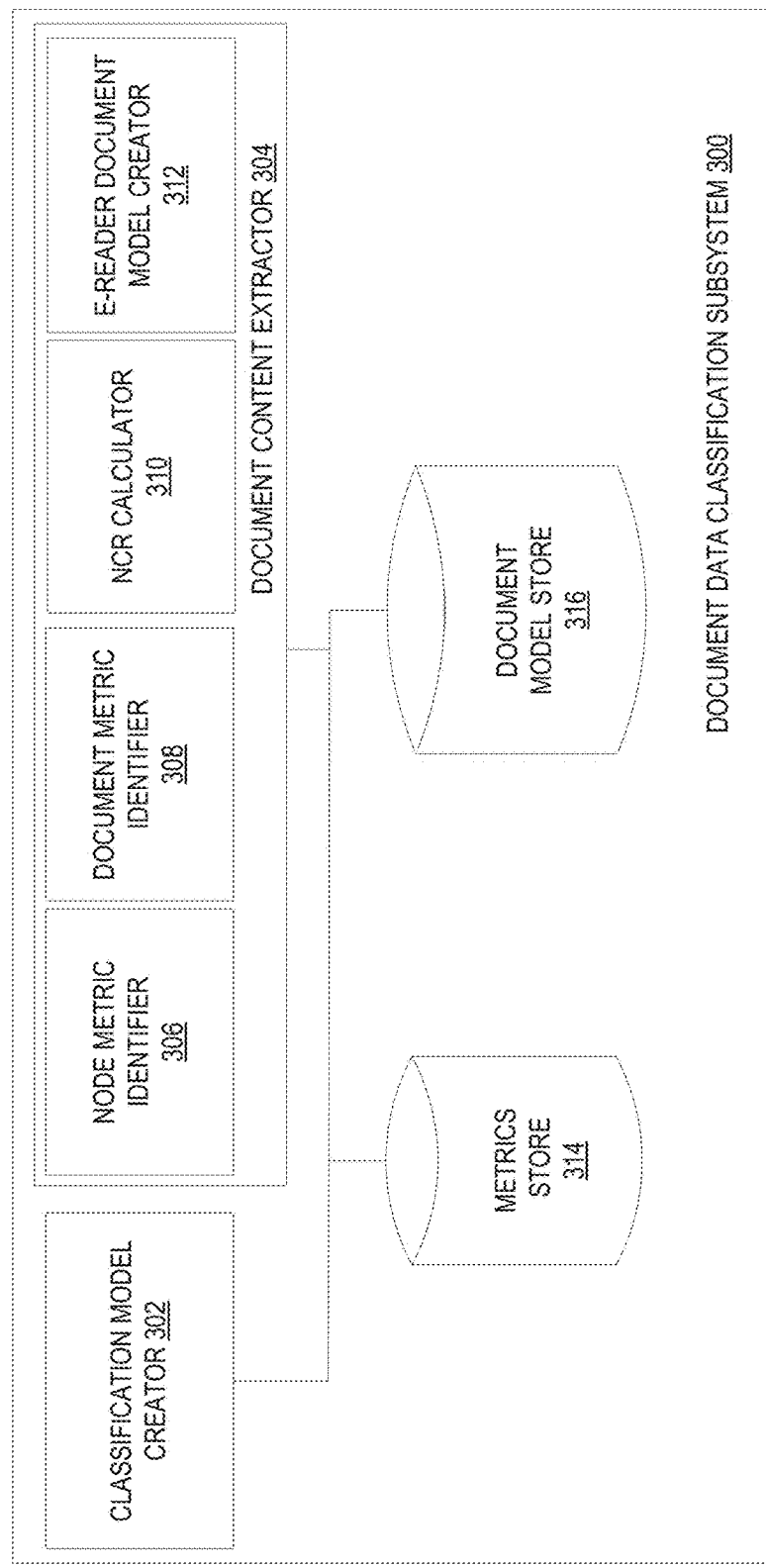
FIG. 3 is a block diagram of one embodiment of a document data classification subsystem.

FIG. 3 is a block diagram of one embodiment of a document data classification subsystem 300. The document data classification subsystem 300 may be the same as the document data classification subsystem 208 of FIG. 2 and may reside partially or entirely on the item providing system 202, user device 206 or any other device or a combination of devices. In one embodiment, the document data classification subsystem 300 includes a classification model creator 302, a document content extractor 304, a metrics store 314, and a document model store 316. The document content extractor may further include a node metric identifier 306, a document metric identifier 308, a noise-to-content ratio (NCR) calculator 310 and an e-reader document model creator 312. The components of the document data classification subsystem 300 may represent modules that can be combined together or separated into further modules, according to some embodiments.

The classification model creator 302 defines a classification model using a training set of electronic documents that have portions manually classified as noise or substantive content. Each electronic document in the training set may be a markup language (e.g., HTML, XHTML, XML) document that can be represented by a document object model (DOM) tree. A DOM tree defines the structure of the document, with internal nodes in the DOM tree corresponding to HTML tags and leaf nodes in the DOM tree corresponding to detailed texts, images or hyperlinks. An internal node is a node that has at least one child node (it is a parent of at least one other node). A leaf node is a node that has a parent node but no children nodes. The DOM tree includes several levels of nodes. At each level, the top-most nodes can include leaf nodes or single nodes (nodes not having any children nodes) and/or parent nodes (nodes having at least one child node). A parent node together with its children nodes forms a sub-tree.

The classification model creator 302 may use a machine learning algorithm (e.g., a decision tree algorithm, a random forest algorithm, a support vector machine (SVM) algorithm, etc.) to determine what node features are indicative of noise and what node features are indicative of substantive content, and which of those features are more significant for noise classification and substantive content classification. Features indicative of noise may be features that are encountered in a large number (e.g., more than 50 percent) of nodes classified as noise, and features that are most significant for noise classification may be features that are encountered in almost all (more than 90 percent) of the nodes classified as noise. Similarly, features indicative of substantive content may be features that are encountered in a large number (e.g., more than 50 percent) of nodes classified as substantive content, and features that are most significant for substantive content classification may be features that are encountered in almost all (more than 90 percent) of the nodes classified as substantive content. Features that are significant for noise classification may define, for example, whether a node is invisible during the display of a document, whether the node includes an advertisement, whether the node includes a comment, a ratio of links to text, a ratio of text in links to plain text, a number of images and/or links referring to advertisement providers, a number of small images, specific node types that are unrelated to textual content such as form elements (e.g., input, text area, button, select, option, optgroup, fieldset, label), frame elements (e.g., frameset, frame, iframe, noframes), programming elements (e.g., script, noscript, applet, object), etc. Features that are significant for substantive content classification may include, for example, a number of words in the node, a number of plain text characters (text characters that are not part of links) in the node, a number of lines and/or paragraphs in the node, lengths of lines in the node, etc.

The classification model creator 302 may define a classification model that specifies a set of noise features (features that are significant for noise classification) and a set of substantive content features (features that are significant for substantive content classification). One embodiment of the classification model creation process is discussed in more detail below in conjunction with FIG. 4.

The document content extractor 304 processes HTML documents at run time to identify noise nodes and substantive content nodes of the HTML documents using the above classification model. In particular, node metric identifier 306 determines metrics for noise features (noise metrics) and metrics for substantive content features (substantive content metrics) of each node within a DOM tree of a document, and stores the metrics in the metrics store 314. The metrics can be determined based on information included in the DOM tree and based on information included in a box model. A box model is a data structure created by a web browser prior to rendering the HTML document. The box model includes additional information about DOM nodes (e.g., node visibility when the document will be displayed, the size of node content in pixels, etc.).

As discussed above, each level of the DOM tree may include single nodes and sub-trees. For a sub-tree, the node metric identifier 306 merges metrics of the parent node with metrics of the children nodes.

Some noise metrics may indicate with a high degree of certainty that a node should be classified as noise. For example, if a node will not be visible during the display of the document, if a node type is unrelated to textual content, or if the node includes an advertisement or a comment, the node metric identifier 306 can remove the node from the document without subjecting it to further processing.

The document metric identifier 308 is responsible for determining metrics of the entire document. In one embodiment, the document metric identifier 308 determines these metrics by merging the metrics of the root node (the topmost node in the DOM tree) with metrics of single nodes and sub-trees at all levels of the DOM tree. Document metrics may include, for example, a number of lines in the document, a number of inline tag nodes (e.g., nodes that define headings and formatting) in the document, a number of small paragraphs (below a predefined size) in the document, a number of large paragraphs (above a predefined size) in the document, and a number of valid containers (predefined document portions, e.g., body, article, section, div, td, li, dd, center, span, content, table) in the document.

The NCR calculator 310 calculates a substantive content score of a single node or a sub-tree using substantive content metrics of the single node or the sub-tree and substantive content metrics of the entire document, and stores the substantive content score in the metrics store 314. For example, a substantive content score of a sub-tree can be calculated as follows: content_score=ratio_length_plain_text+count_inline_nodes/document_inline nodes+substree_lines/document_lines+(subtree_large_images+subtree_medium_images)/subtree_images+subtree_small_paragraphs/document_small_paragraphs+subtree_large_paragraphs/document_large_paragraphs In the above formula, ratio_length_plain_text is a ratio of plain text characters in a node or sub-tree to a number of overall plan text characters in the document. Count_inline_nodes is a number of inline tag nodes in a node or a sub-tree. Document_inline nodes is a number of overall inline tag nodes in the document. Substree_lines is a number of lines in a subtree, and document_lines is a number of overall lines in the document. Subtree_large_images is a number of large images (with width equal or greater than 400 pixels, height equal to or greater than 150 pixels and area greater than 50000 square pixels) in a sub-tree, subtree_medium_images is a number of medium images (with width equal to or greater than 150 pixels, height equal to or greater than 150 pixels and area greater than 1500 square pixels) in a sub-tree, and subtree_images is an overall number of images in a subtree. Subtree_small_paragraphs and document_small_paragraphs are numbers of small paragraphs (50 words or less) in a sub-tree and the entire document respectively. Subtree_large_paragraphs and document_large_paragraphs are numbers of large paragraphs (80 words or more) in a sub-tree and the entire document respectively.

In alternative embodiments, more or less metrics can be considered when calculating a substantive content score of a sub-tree. In addition, different ratios of metrics can be used in the calculation. For example, a substantive content score of a sub-tree can be calculated as follows: content_score=ratio_length_plain_text+substree_lines/document_lines+subtree_small_images/subtree_images+subtree_large_paragraphs/document_large_paragraphs The NCR calculator 310 also calculates a noise score of the single node or the sub-tree using noise metrics of the single node or the sub-tree and noise metrics of the entire document, and stores the noise score in the metrics store 314. For example, a noise score of a sub-tree can be calculated as follows: Noise_score=subtree_link_density+ratio_length_link_text+(subtree_ad_images+subtree_skip_images)/(subtree_images+subtree_skip_images)+subtree_ad_links/subtree_links+subtree_valid_containers/document_valid_containers+(subtree_small_images/subtree_images)*0.2

In the above formula, subtree_link_density is a ratio of link nodes to text nodes in a sub-tree. A link node is a node corresponding to a link. A text node is a node corresponding to text. Ratio_length_link_text is a ratio of a number of characters in link nodes in the sub-tree to a number of characters in link nodes in the document. Subtree_ad_images is a number of images pointing to advertisement providers in the sub-tree. Substree_skip_images is a number of images smaller than a predefined size (width less than 90 pixels, height less than 90 pixels ands area less than 5500 square pixels) in the sub-tree. Subtree_images is an overall number of images in a sub-tree. Subtree_ad_links is a number of links pointing to advertisement providers in the sub-tree. Subtree_links is an overall number of links in the sub-tree. Subtree_valid_containers and document_valid_containers are numbers of valid containers in the sub-tree and the document respectively. Subtree_small_images is a number of small images (e.g., width is equal to or below 90 pixels, height is equal to or below 90 pixels and area is equal to or below 5500 square pixels). Subtree_images is an overall number of images in the subtree.

In alternative embodiments, more or less metrics can be considered when calculating a noise score of a sub-tree. In addition, different weights and/or different ratios of metrics can be used in the calculation. For example, a noise score of a sub-tree can be calculated as follows:

Noise_score=ratio_length_link_text+subtree_ad_images/ subtree_images+subtree_ad_links/subtree_links+(subtree_small_images/subtree_images)*0.3.

The NCR calculator 310 then divides the noise score by the substantive content score to determine a noise-to-content ratio (NCR) of the single node or the sub-tree, and stores the NCR in the metrics store 314. In an alternative embodiment, the document data classification subsystem calculates a noise-to-content for each node, and then determines a noise-to-content ratio of a sub-tree using noise-to-content ratios of the nodes in the sub-tree (e.g., as an average noise-to-content ratio, a median noise-to-content ratio, maximum content-to-noise ratio, etc.).

The NCR calculator 310 further sorts the nodes and sub-trees using their NCRs, selects nodes and sub-trees with lower NCRs (e.g., below a NCR threshold) and discards nodes and sub-trees with higher NCRs (e.g., above a NCR threshold). The e-reader document model creator 312 then creates an e-reader document model using the selected nodes and sub-trees and stores it in the document model store 316. The e-reader document model is subsequently used (e.g., by a formatting system) to convert the selected nodes and sub-trees into a format understandable by e-book readers.

Figure 4:
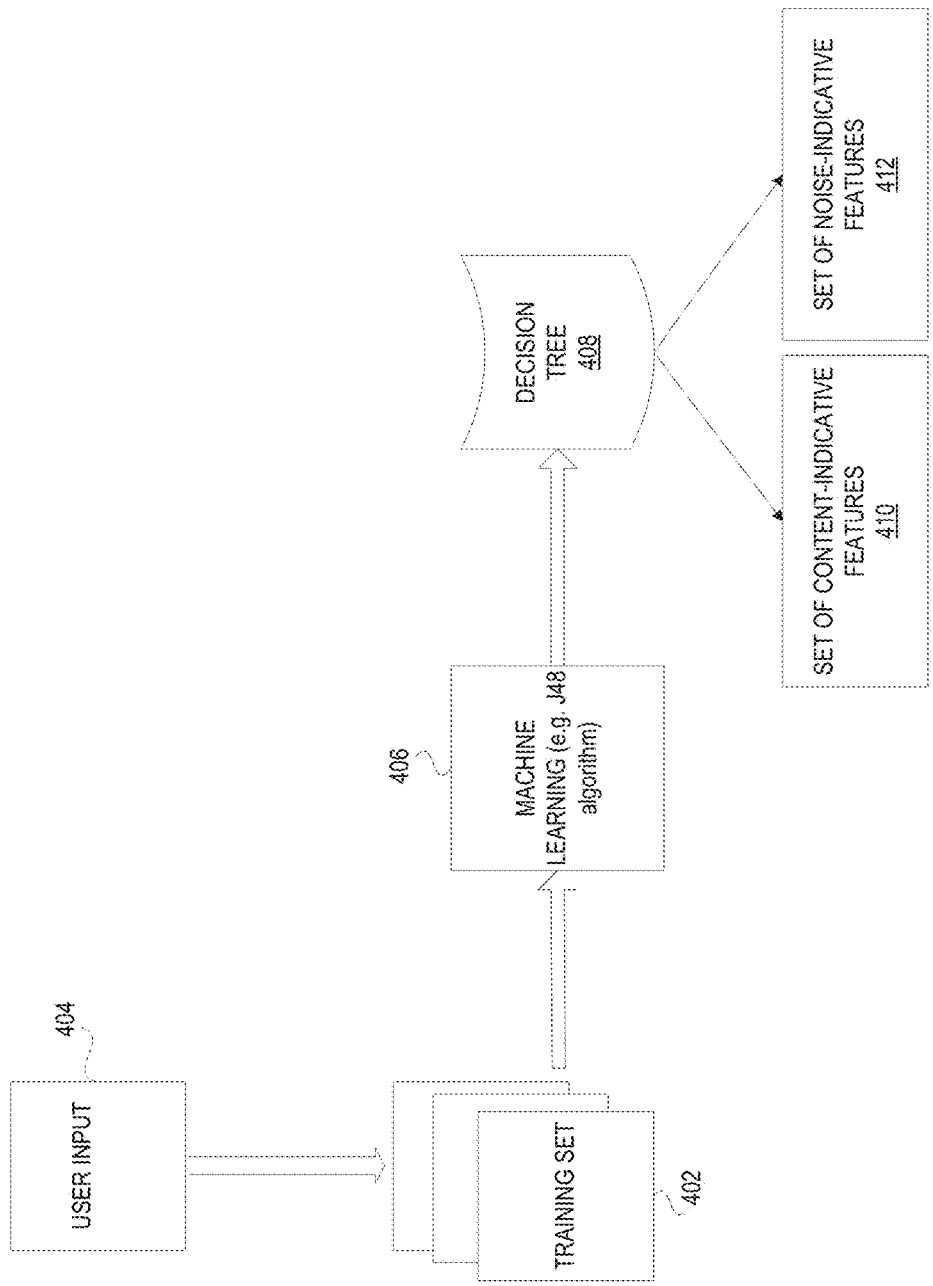
FIG. 4 illustrates the creation of a content classification model in accordance with some embodiments of the present disclosure.

FIG. 4 illustrates the creation of a content classification model in accordance with some embodiments of the present disclosure. A large set of HTML documents (e.g., a training set of 1000 HTML documents) 402 is used to define a classification model. Nodes and/or sub-trees of HTML documents 402 in the training set are marked as noise or substantive content based on user input 404. Machine learning algorithm (e.g., decision tree algorithm) 406 processes the HTML documents 402 to learn what node features are indicative of noise and what node features are indicative of substantive content, and which of those features are more significant for noise classification and substantive content classification. Based on this learning phase, the algorithm 406 creates a decision tree 408 predicting a combination of features that should lead to noise classification and a combination of features that should lead to substantive content classification. Based on the decision tree 408, a set of substantive content-indicative features 410 and a set of noise-indicative features 412 are created. As discussed above, based on the set of substantive content-indicative features 410 and the set of noise-indicative features 412, nodes of a document are classified as noise or substantive content, allowing noise to be removed from the document.

As discussed above, embodiments of the present disclosure are not limited to the use of a decision tree algorithm. Rather any other machine learning algorithm can be used with the present disclosure (e.g., an SVL algorithm, an association rule learning algorithm, etc.) resulting in a data structure other than a decision tree. The resulting data structure can then be used to obtain the set of substantive content-indicative features 410 and the set of noise-indicative features 412.

Figure 5:
FIG. 5 illustrates a web page before and after noise removal, in accordance with some embodiments of the present disclosure.
Figure 5:

FIG. 5 illustrates web pages before and after noise removal, in accordance with some embodiments of the present disclosure. The original article web page 500 includes advertisements, unrelated images, a comment section and other noise 502 within dotted lines. The document data classification subsystem processes the web page 500 as discussed above, resulting in a modified web page 510 that includes only substantive content. As shown, noise 502 is no longer included in the web page 510.

Figure 6:
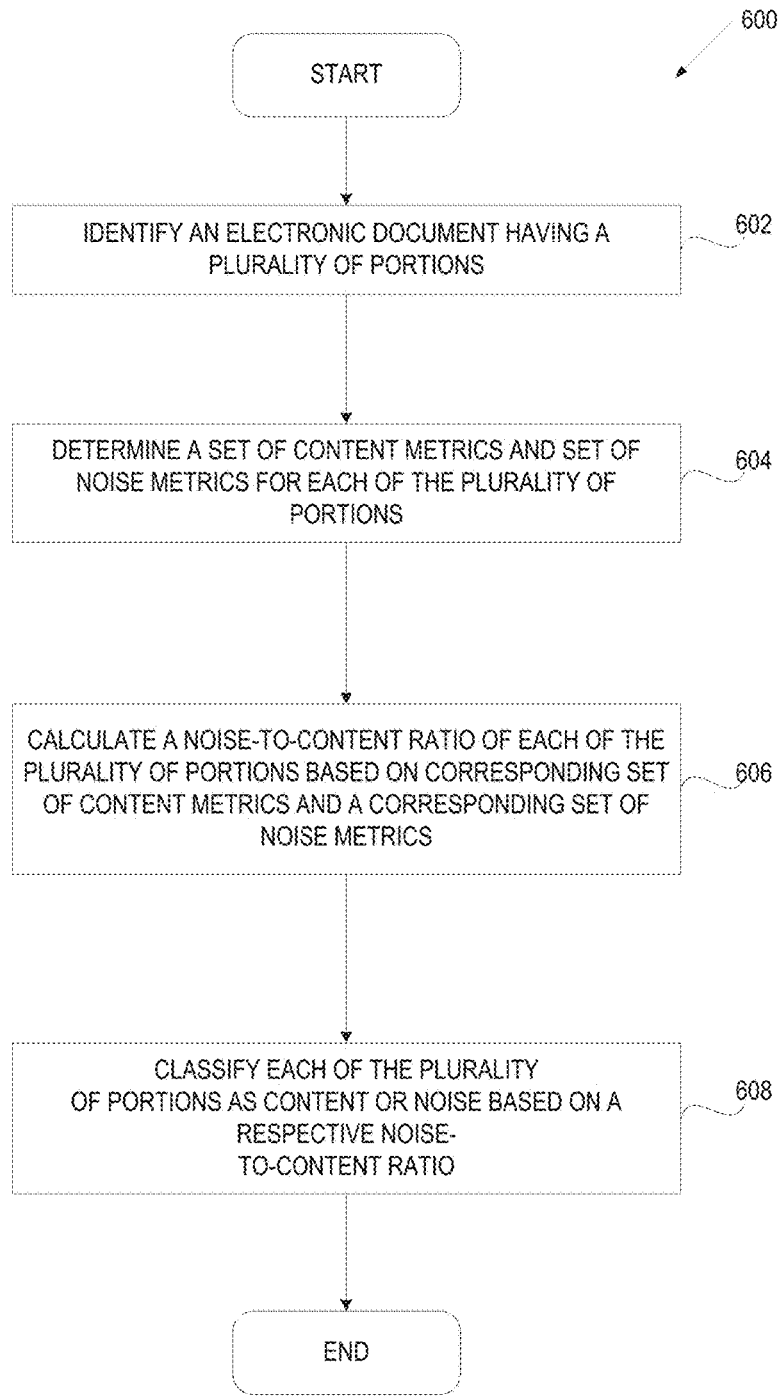
FIG. 6 is a flow diagram of one embodiment of a method for classifying portions of an electronic document based on a noise-to-content ratio.

FIG. 6 is a flow diagram of one embodiment of a method for classifying portions of an electronic document based on a noise-to-content ratio. The method is performed by processing logic that may comprise hardware (circuitry, dedicated logic, etc.), software (such as is run on a general purpose computer system or a dedicated machine), or a combination of both. In one embodiment, the method is performed by a document data classification subsystem (e.g., document data classification subsystem 208 of FIG. 2).

Referring to FIG. 6, method 600 begins with the document data classification subsystem identifying an electronic document having multiple portions (block 602). The electronic document may be, for example, an article in the form of a markup language document (e.g., an HTML, XHTML or XML document). Portions of the electronic document may include, for example, title, byline, text content, an image related to the text content, a comment section, a banner, several advertisements and several small images unrelated to the text content. An HTML document may be represented by a DOM tree, which defines the structure of the HTML document. The DOM tree includes multiple blocks, where each block is a single node or a sub-tree (a parent node and child nodes of the parent node).

At block 604, the document data classification subsystem determines a set of substantive content metrics and a set of noise metrics for each portion of the document. Each substantive content metric may be a value (e.g., a number or a yes/no indicator) indicating whether a document portion includes substantive content, and may specify, for example, a number of words in the document portion, a number of plain text characters in the document portion, a number of lines and/or paragraphs in the document portion, lengths of lines in the document portion, etc. Each noise metric may be a value (e.g., a number or a yes/no indicator) indicating whether a document portion includes noise, and may specify, for example, whether the document portion will be invisible when the document is displayed, whether the document portion includes an advertisement or comment, a ratio of links to text in the document portion, a ratio of text in links to plain text in the document portion, a number of images and/or links referring to advertisement providers in the document portion, a number of small images in the document portion, etc.

At block 606, the document data classification subsystem calculate a substantive content score of the document portion based on its metrics indicative of substantive content, and a noise score of the document portion based on its metrics indicative of noise. The document data classification subsystem can then use the substantive content score and the noise score to determine a noise-to-content ratio of the document portion. The document data classification subsystem repeats blocks 604 and 606 for other portions of the document, and classifies each portion of the document as noise or substantive content based on its noise-to-content ratio (block 608). In one embodiment, the document data classification subsystem classifies a portion as noise if its noise-to-content ratio exceeds a threshold. If its noise-to-content ratio does not exceed a threshold, the document data classification subsystem classifies the portion as substantive content. Alternatively, the document data classification subsystem classifies a predefined number (e.g., 1 or 2) of portions with the lowest noise-to-content ratio as substantive content and the remaining portions as noise. Substantive content portions (and not the noise portions) may then be converted into a format understandable by e-readers or other mobile devices and the resulting content is made available for distribution and/or consumption by the mobile devices.

Figure 7:
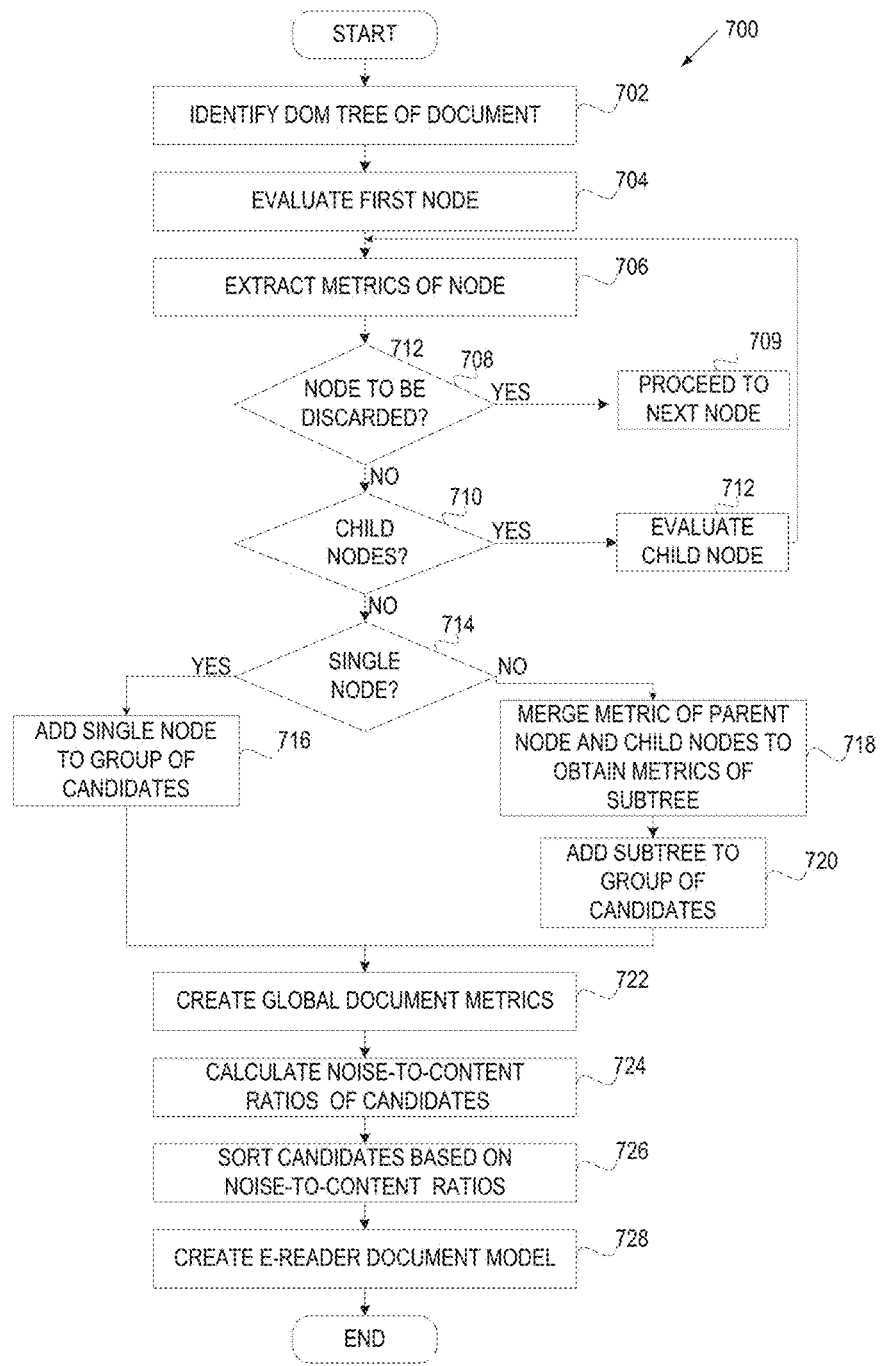
FIG. 7 is a flow diagram of one embodiment of a method for removing noise from an HTML document.

FIG. 7 is a flow diagram of one embodiment of a method for removing noise from an HTML document. The method is performed by processing logic that may comprise hardware (circuitry, dedicated logic, etc.), software (such as is run on a general purpose computer system or a dedicated machine), or a combination of both. In one embodiment, the method is performed by a document data classification subsystem (e.g., document data classification subsystem 208 of FIG. 2).

Referring to FIG. 7, method 700 begins with the document data classification subsystem identifying a DOM tree of a document (block 702). As discussed above, the DOM tree defines the structure of the HTML document and includes several levels of nodes. Each node may be a single node or a node having child nodes. A single node or a sub-tree (a parent node together with its child nodes) represents one of multiple blocks of the DOM tree.

At block 704, the document data classification subsystem evaluates a first node. At block 706, the document data classification subsystem determines noise metrics and substantive content metrics of the node using a classification model created during the training stage. At block 708, the document data classification subsystem determines whether any of the noise metrics clearly indicate that the node should be classified as noise and therefore discarded. In one embodiment, the document data classification subsystem makes this determination by first determining whether the node will be invisible to a user when the document is displayed by the browser without the user scrolling down the screen. Depending on whether the node will be visible or not, the node can be referred to as above the fold (the end of the screen) or below the fold. If the node will not be visible, the document data classification subsystem discards the node. Otherwise, the document data classification subsystem determines whether the node has one of predefined node types that are unrelated to textual content such as form elements (e.g., input, text area, button, select, option, optgroup, fieldset, label), frame elements (e.g., frameset, frame, iframe, noframes), programming elements (e.g., script, noscript, applet, object), etc. If so, the document data classification subsystem discards the node. If not, the document data classification subsystem determines whether the node is an advertisement node (e.g., it contains an advertisement or is pointing to an advertiser provider) or a comment node (e.g., it is pointing to a comment provider). If the node is an advertisement node or a comment node, the document data classification subsystem discards the node.

If the node is discarded, method 700 proceeds to the next node in the DOM tree (block 709). If the node is not discarded, the document data classification subsystem determines whether the node has any child nodes (block 712). If so, the document data classification subsystem begins evaluating a child node (block 712) and repeats the above process until all child nodes are processed.

At block 714, the document data classification subsystem determines whether the last processed node is a single node or part of a sub-tree. If it is a single node, the document data classification subsystem adds this node to a group of candidates (block 716). If the node is part of a sub-tree, the document data classification subsystem merges the metrics of the parent node with the metrics of all children to calculate the metrics of the sub-tree (blocks 718) and adds the sub-tree to the group of candidates (block 720).

At block 722, the document data classification subsystem creates the overall metrics of the document. At block 724, the document data classification subsystem calculates noise scores and substantive content scores of the candidates (e.g., using formulas discussed above) and then uses these scores to determine the noise-to-content ratios of the candidates. At block 726, the document data classification subsystem sorts the candidates based on their noise-to-content ratios and selects a predefined number of candidates with the lowest noise-to-content ratios. At block 728, the document data classification subsystem creates an e-reader document model using the selected candidates.

In other embodiments, the document data classification subsystem uses a three layer system for noise extraction. In particular, the document data classification subsystem starts with the noise-to-content ratio approach discussed above and determines at block 726 if any of the candidates have a noise-to-content ratio below a threshold (e.g., 0.7). If so, method 700 proceeds to block 728 as discussed above. If not, the document data classification subsystem uses a visual largest block (VLB) classification approach which is intended to find the candidate that is most prominent to the human eye and draws most attention. In particular, the VLB classification approach may use the following formula for a substantive content score:

vlb_content_score=ratio_node_area+ratio_node_atf+ratio_length_text+subtree inline_nodes/document_inline_nodes+subtree_images/document_images In this formula, ratio_node_area is a ratio of pixels in the sub-tree to the overall number of pixels in the document. Ratio_node_atf is a ratio of pixels above the fold in the sub-tree to overall number of pixels in the document. Ratio_length_text is a ratio of text characters in the sub-tree to the overall text characters in the document.

In addition, the VLB classification approach may use the following formula for a noise score:

vlb_noise_score=subtree_valid_containers/document_valid_containers

VLB noise-to-content ratio calculations will be based on vlb substantive content scores and vlb noise scores. The candidates will then be ranked based on their VLB noise-to-content ratios. If any of the candidates have a VLB noise-to-content ratio below a threshold (e.g., 0.7), the noise removal process will be similar to the one discussed above. If not, the document data classification subsystem will use a content visibility approach which arranges above the fold content (content visible to a user without the user scrolling down the screen) before below the fold content (content not immediately visible to users).

Figure 8:
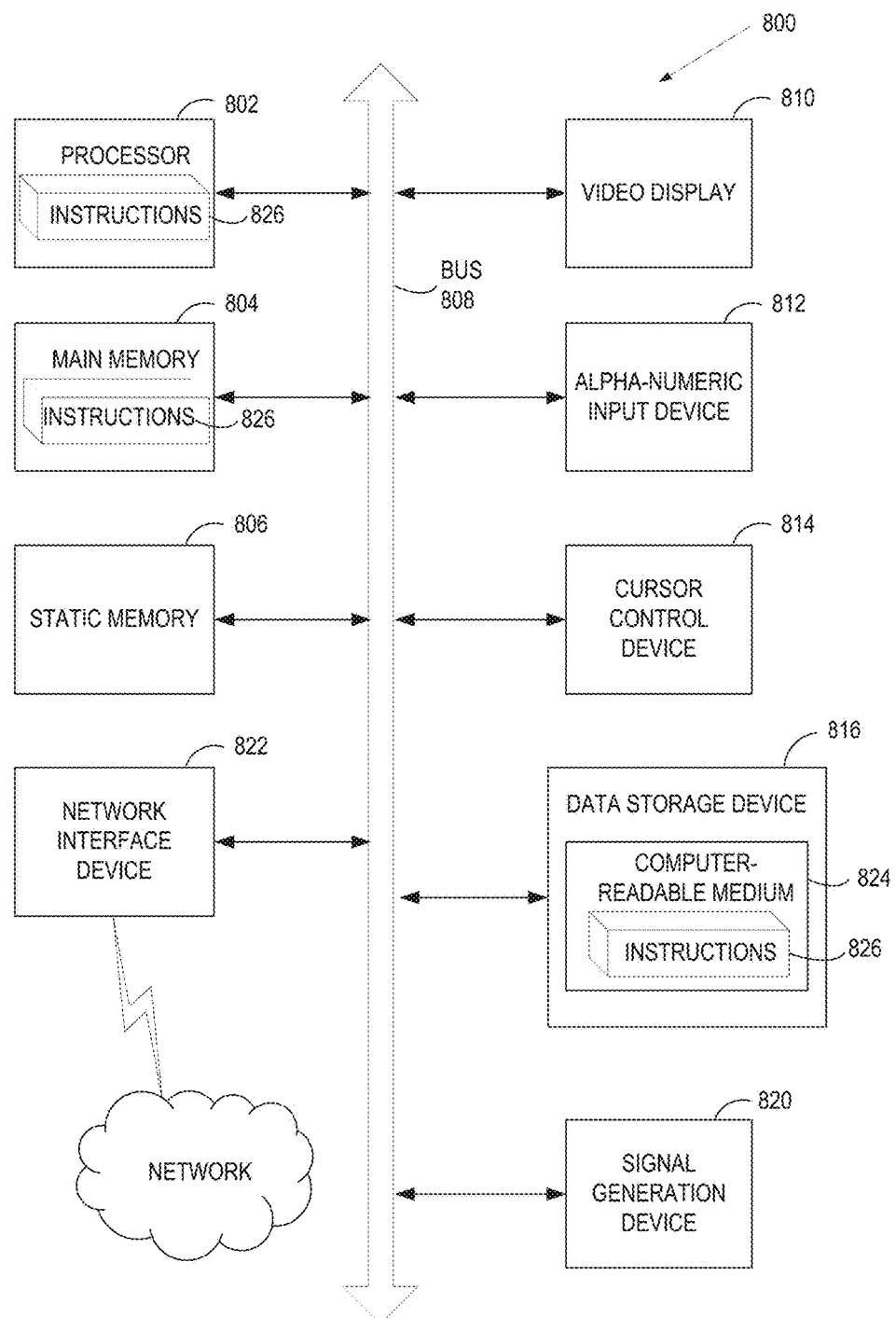
FIG. 8 illustrates an item providing system.

FIG. 8 illustrates an item providing system 800 in the form of a computer system within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The system 800 includes a processor 802, a main memory 804 (e.g., read-only memory (ROM), flash memory, dynamic random access memory (DRAM) such as synchronous DRAM (SDRAM)), a static memory (e.g., flash memory, static random access memory (SRAM)), and a data storage device 816, which communicate with each other via a bus 806.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute the item ingestion subsystem 108 for performing the operations and steps discussed herein.

The system 800 may further include a network interface device 822. The system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

A drive unit may include a computer-readable storage medium 824 on which is stored one or more sets of instructions (e.g., instructions of item ingestion subsystem 108) embodying any one or more of the methodologies or functions described herein. The instructions of the item ingestion subsystem 108 may also reside, completely or at least partially, within the main memory 804 and/or within the processor 802 during execution thereof by the system 800, the main memory 804 and the processor 802 also constituting computer-readable media. The instructions of the item ingestion subsystem 108 may further be transmitted or received over a network via the network interface device 822.

While the computer-readable storage medium 824 is shown in an embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "creating", "notifying", "allowing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   classifying, based on user input, a plurality of portions of each markup language document in a training set of markup language documents, wherein each portion of each markup language document is classified as one of substantive content or noise;
   applying a machine learning algorithm to the plurality of portions of each markup language documents in the training set;
   determining, based on an outcome of the machine learning algorithm, a model for classifying document portions comprising a set of features of the portions that are indicative of substantive content and a set of features of the portions that are indicative of noise;
   classifying, using the model, a second plurality of portions of a markup language document that is not part of the training set, wherein each of the second plurality of portions is classified as one of substantive content or noise;
   determining a noise-to-content ratio of each of the second plurality of portions of the markup language document; and
   removing a first portion of the second plurality of portions that is classified as noise and has a higher noise-to-content ratio than other portions of the second plurality of portions.

2. The method of claim 1, wherein each portion of each markup language document is a node or a sub-tree in a document object model (DOM) tree of a respective markup language document, the sub-tree having a parent node and one or more child nodes, wherein the applying the machine learning algorithm comprising applying the machine learning algorithm to respective node or sub-tree in the DOM tree of the respective markup language document.

3. The method of claim 1, further comprising:
   selecting, from the set of features that are indicative of noise, a subset of features that are significant for noise classification, wherein each feature in the subset of features that are significant for noise classification was encountered in at least a threshold number of markup language document portions classified as substantive content; and
   selecting, from the set of features that are indicative of substantive content, a subset of features that are significant for substantive content classification, wherein each feature in the subset of features that are significant for substantive content classification was encountered in at least a threshold number of markup language document portions classified as noise.

4. The method of claim 3, wherein the subset of features that are significant for noise classification comprises at least one of: a node visibility during rendering of the markup document, a node comprising an advertisement, a node associated with a comment provider, a ratio of a number of link nodes in a respective portion to a number of text nodes in the respective portion, a number of characters in links within the respective portion, a number of images in the respective portion, wherein the images comprise advertisements, a number of link nodes in the respective portion, wherein the link nodes are links to nodes comprising advertisements, a number of valid containers in the respective portion, or a number of small images in the respective portion, wherein a small image is an image has a size smaller than a threshold.

5. The method of claim 3, wherein the subset of features that are significant for substantive content classification comprises at least one of: a number of plain text characters in a respective portion, a number of inline tag nodes in the respective portion, a number of lines in the respective portion, a number of images in the respective portion, or a number of paragraphs in the respective portion.

6. A system comprising:
   a memory device to store an electronic document;
   a processing device operatively coupled to the memory device, the processing device to:
      classify a first portion of the electronic document as substantive content;
      classify a second portion of the electronic document as noise;
      determine, using a machine learning algorithm, a first feature of the first portion of the electronic document indicative of substantive content;
      determine, using the machine learning algorithm, a second feature of the second portion of the electronic document indicative of noise;
      classify, using a model comprising the first feature and the second feature, a plurality of portions of a second electronic document, wherein each of the plurality of portions of the second electronic document is classified as one of substantive content or noise;
      determine a noise-to-content ratio of each of the plurality of portions of the second electronic document; and
      remove a first portion of the plurality of portions that is classified as noise and has a higher noise-to-content ratio than other portions of the plurality of portions.

7. The system of claim 6, wherein the machine learning algorithm is a decision tree algorithm, a random forest algorithm, or a support vector machine (SVM) algorithm.

8. The system of claim 6, wherein, to determine the first feature of the first portion, the processing device is further to determine that the first portion of the electronic document is invisible during rendering of the electronic document; determine that the first portion of the electronic document refers to an advertisement provider; or determine that the first portion of the electronic document refers to a comment provider.

9. The system of claim 6, wherein the processing device is further to:
   determine the first portion includes a first threshold number of features that are the first feature; and
   determine the second portion includes a second threshold number of features that are the second feature.

10. The system of claim 9, wherein the first threshold number is 90 percent of features indicative of substantive content are the first feature, and wherein the second threshold number is 50 percent of features indicative of noise are the second feature.

11. The system of claim 6, wherein the electronic document is part of a set of training documents for classifying a plurality of features of electronic documents as substantive content or noise.

12. The system of claim 6, wherein the first feature indicates a number of words in the first portion, wherein the first feature indicates a number of plain text characters in the first portion, wherein the first feature indicates a number of lines or paragraphs in the first portion, or wherein the first feature indicates an average lengths of lines in the first portion.

13. The system of claim 6, wherein the second feature indicates the second portion is invisible when the electronic document is displayed by a display, wherein the second feature indicates the second portion is an advertisement, wherein the second feature indicates the second portion is a comment, wherein the second feature indicates the second portion is a link to text, wherein the second feature indicates the second portion is a link to plain text, wherein the second feature indicates the second portion is an image for an advertisement, wherein the second feature indicates the second portion is a link to an advertisement provider; wherein the second feature indicates the second portion is a set of images; or wherein the second feature indicates the second portion is text that is are unrelated to a type of the electronic document.

14. The system of claim 6, wherein the processing device is further to:
 determine a first ranking of the first feature among a first set of features indicative of substantive content; and
 determine a second ranking of the second feature among a second set of features indicative of noise.

15. A non-transitory computer readable storage medium including instructions that, when executed by a processing device, cause the processing device to:
 classify a first portion of a first electronic document as substantive content or noise;
 classify a second portion of the first electronic document as substantive content or noise;
 classify a third portion of the first electronic document as substantive content or noise;
 determine a first noise-to-content ratio for the first portion;
 determine a second noise-to-content ratio for the second portion;
 determine a third noise-to-content ratio for the third portion;
 sort a list of the first portion, the second portion, and the third portion in order from a highest noise-to-content ratio to a lowest noise-to-content ratio using a machine learning algorithm; and
 remove at least one of the first portion, the second portion, and the third portion from the first electronic document, starting with the highest noise-to-content ratio in the list.

16. The non-transitory computer readable storage medium of claim 15 wherein the processing device is further to:
 determine a first set of features of the first portion of the first electronic document indicative of substantive content using the machine learning algorithm; and
 determine a second set of features of the second portion of the first electronic document indicative of noise using the machine learning algorithm.

17. The non-transitory computer readable storage medium of claim 16 wherein the processing device is further to:
 generate, in view of the first set of features, a first decision tree predicting a first combination of features that indicates whether a second electronic document includes substantive content; and
 generate, in view of the second set of features, a second decision tree predicting a second combination of features that indicates whether the second electronic document includes noise.

18. The non-transitory computer readable storage medium of claim 15, wherein the machine learning algorithm is a decision tree algorithm, a random forest algorithm, or a support vector machine (SVM) algorithm.

19. The non-transitory computer readable storage medium of claim 15, wherein the first portion and the second portion are stored as nodes within a document object model (DOM) tree.

20. The non-transitory computer readable storage medium of claim 15, wherein the processing device is further to remove one or more parts of the second portion that are indicative of noise.

* * * * *